(12) United States Patent
Takatani et al.

(10) Patent No.: US 9,472,348 B2
(45) Date of Patent: Oct. 18, 2016

(54) METHOD OF PRODUCING CONDUCTIVE POLYMER PARTICLE DISPERSION, AND METHOD OF PRODUCING ELECTROLYTIC CAPACITOR USING SAID CONDUCTIVE POLYMER PARTICLE DISPERSION

(71) Applicant: Panasonic Intellectual Property Management Co., Ltd., Osaka (JP)

(72) Inventors: Kazuhiro Takatani, Yamaguchi (JP); Tatsuji Aoyama, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/859,240

(22) Filed: Sep. 18, 2015

(65) Prior Publication Data
US 2016/0012971 A1    Jan. 14, 2016

Related U.S. Application Data

(63) Continuation of application No. PCT/JP2013/002154, filed on Mar. 29, 2013.

(51) Int. Cl.
| | |
|---|---|
| *H01G 9/00* | (2006.01) |
| *H01G 9/028* | (2006.01) |
| *C08G 61/12* | (2006.01) |
| *C08L 65/00* | (2006.01) |
| *B01J 39/20* | (2006.01) |
| *H01G 9/15* | (2006.01) |

(Continued)

(52) U.S. Cl.
CPC ............ *H01G 9/0036* (2013.01); *B01J 39/20* (2013.01); *C08G 61/126* (2013.01); *C08L 65/00* (2013.01); *H01B 1/12* (2013.01); *H01B 1/20* (2013.01); *H01G 9/0032* (2013.01); *H01G 9/028* (2013.01); *H01G 9/15* (2013.01); *H01G 9/151* (2013.01); *C08G 2261/128* (2013.01); *C08G 2261/1424* (2013.01); *C08G 2261/18* (2013.01); *C08G 2261/3223* (2013.01); *C08G 2261/43* (2013.01); *C08G 2261/794* (2013.01)

(58) Field of Classification Search
None
See application file for complete search history.

(56) References Cited

U.S. PATENT DOCUMENTS

| | | |
|---|---|---|
| 2003/0144465 A1 | 7/2003 | Leenders et al. |
| 2003/0211331 A1 | 11/2003 | Louwet et al. |
| 2005/0040372 A1 | 2/2005 | Tahon et al. |

(Continued)

FOREIGN PATENT DOCUMENTS

| | | |
|---|---|---|
| JP | 8-259673 | 10/1996 |
| JP | 2005-511808 | 4/2005 |

(Continued)

OTHER PUBLICATIONS

International Search Report of PCT application No. PCT/JP2013/002154 dated Jul. 16, 2013.

*Primary Examiner* — Jack Chen
(74) *Attorney, Agent, or Firm* — McDermott Will & Emery LLP

(57) ABSTRACT

A dispersion liquid including one of thiophene and derivatives thereof, a polyanion, and a solvent is prepared. Then, the dispersion liquid is mixed with an oxidizing agent so as to oxidatively polymerize the one of thiophene and derivatives thereof. During the oxidative polymerization, a temperature of the dispersion liquid is 35° C. or less and a dissolved oxygen concentration of the dispersion liquid is 7 ppm or less.

4 Claims, 2 Drawing Sheets

(51) Int. Cl.
*H01B 1/12* (2006.01)
*H01B 1/20* (2006.01)

(56) References Cited

U.S. PATENT DOCUMENTS

2006/0027791 A1 2/2006 Tahon et al.
2008/0017834 A1 1/2008 Skulason et al.
2014/0022706 A1 1/2014 Sugawara et al.
2016/0012971 A1* 1/2016 Takatani .............. H01G 9/0036
                                                29/25.03

FOREIGN PATENT DOCUMENTS

| JP | 2005-511808 A | 4/2005 |
| JP | 2008-171761 | 7/2008 |
| JP | 2008-222850 | 9/2008 |
| JP | 2009-538973 | 11/2009 |
| JP | 2012-222146 | 11/2012 |

* cited by examiner

US 9,472,348 B2

METHOD OF PRODUCING CONDUCTIVE POLYMER PARTICLE DISPERSION, AND METHOD OF PRODUCING ELECTROLYTIC CAPACITOR USING SAID CONDUCTIVE POLYMER PARTICLE DISPERSION

BACKGROUND

1. Technical Field

The present invention relates to a method of manufacturing a conductive polymer microparticle dispersion applicable to an antistatic agent, an electrolyte for an electrolytic capacitor, a display element, and others. The present invention also relates to a method of manufacturing an electrolytic capacitor formed by using the conductive polymer microparticle dispersion.

2. Description of Related Art

Dopant-containing polymers having a π-conjugated structure are known to have high conductivity. Dopants are substances to develop conductivity. These polymers are used in antistatic agents, display elements, etc. because of their chemical and physical stability in addition to their high conductivity. They have also been suggested to be used in solid electrolytes for electrolytic capacitors.

One known process of manufacturing such a conductive polymer having a π-conjugated structure is to oxidatively polymerize a monomer with an oxidizing agent in the presence of a dopant. For example, the use of 3,4-ethylenedioxythiophene as a monomer, and a polystyrene sulfonic acid as the dopant results in highly conductive poly3,4-ethylenedioxythiophene doped with the polystyrene sulfonic acid. The poly3,4-ethylenedioxythiophene prepared by this method is in the form of microparticles dispersed in water. Thus, the above-described method can prepare a conductive polymer microparticle dispersion (see, for example, Japanese Unexamined Patent Publication No. 2008-222850).

SUMMARY

The method of manufacturing a conductive polymer microparticle dispersion according to the present invention includes the following steps:

(A) preparing a dispersion liquid including one of thiophene and derivatives thereof, a polyanion, and a solvent;

(B) mixing the dispersion liquid with an oxidizing agent so as to oxidatively polymerize the one of thiophene and derivatives thereof. During the oxidative polymerization, a temperature of the dispersion liquid is 35° C. or less and a dissolved oxygen concentration of the dispersion liquid is 7 ppm or less.

Using the conductive polymer microparticle dispersion prepared by the above-described method as a material of a solid electrolyte for an electrolytic capacitor can provide an electrolytic capacitor with very low ESR and improved heat resistance.

DETAILED DESCRIPTION OF PREFERRED EMBODIMENTS

It is possible to obtain a conductive polymer by removing the solvent component from the conductive polymer microparticle dispersion prepared by the above-described conventional method. However, when this conductive polymer is used in a solid electrolyte for an electrolytic capacitor, the electrolytic capacitor may have high ESR depending on the method and conditions of forming a conductive polymer film. Therefore, when a conductive polymer microparticle dispersion having a π-conjugated structure is used as a solid electrolyte for electrolytic capacitors, it is crucial to optimize the method and conditions of forming the conductive polymer film.

Figure 1:
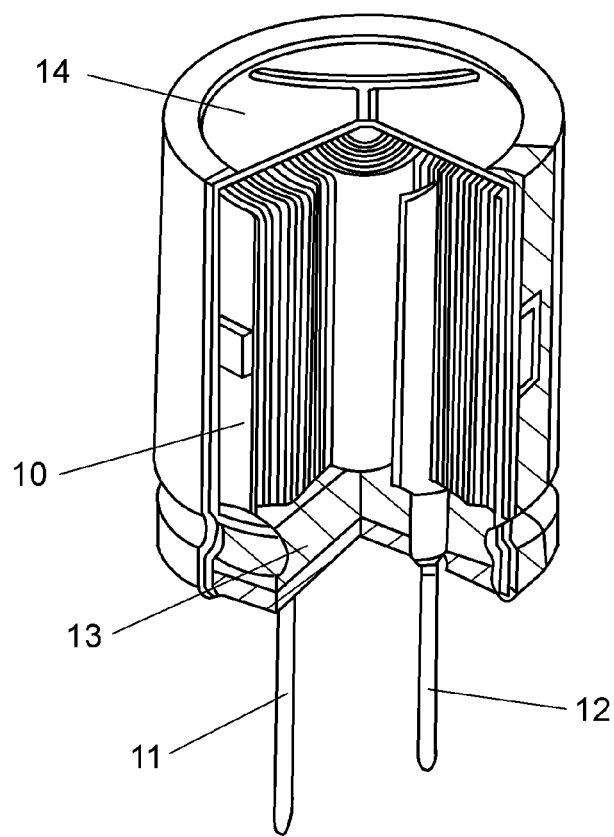
FIG. 1 is a partially cutaway schematic perspective view of an electrolytic capacitor formed by using a conductive polymer microparticle dispersion prepared by the method according to an exemplary embodiment of the present invention.
Figure 2:
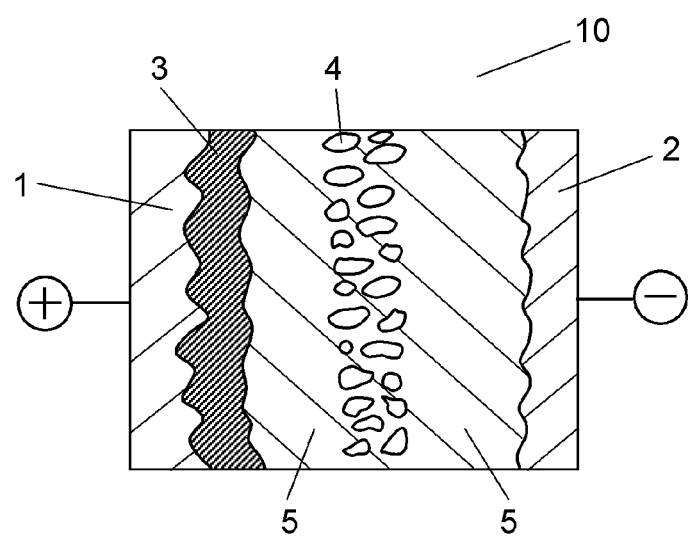
FIG. 2 is a partial sectional view of a capacitor element contained in the electrolytic capacitor shown in FIG. 1.

An exemplary embodiment of the present invention will now be described with reference to FIGS. 1 and 2. FIG. 1 is a partially cutaway perspective view of an electrolytic capacitor manufactured by using a conductive polymer microparticle dispersion prepared by the method according to the exemplary embodiment of the present invention. FIG. 2 is a partial sectional view of a capacitor element contained in the electrolytic capacitor shown in FIG. 1.

As shown in FIG. 1, the electrolytic capacitor includes capacitor element 10, metal case 14, and sealing member 13. Case 14 houses capacitor element 10, and sealing member 13 seals the opening of case 14. Thus, case 14 and sealing member 13 together form an outer body which seals capacitor element 10.

As shown in FIG. 2, capacitor element 10 includes positive electrode 1, negative electrode 2, separator 4, and solid electrolyte layer 5. Separator 4 and solid electrolyte layer 5 are interposed between positive electrode 1 and negative electrode 2. Positive electrode 1 is made of an aluminum foil whose surface is etched to roughen it first and then subjected to a chemical conversion treatment to form dielectric oxide film layer 3. Negative electrode 2 is also made of an aluminum foil whose surface is etched to roughen it. Positive electrode 1 and negative electrode 2 are connected to lead terminals 11 and 12, respectively, as shown in FIG. 1. Lead terminals 11 and 12 are led out through sealing member 13.

In capacitor element 10, positive electrode 1 and negative electrode 2 are wound with separator 4 interposed therebetween. Capacitor element 10 is impregnated with an after-mentioned conductive polymer microparticle dispersion, and then dried to remove the solvent component so as to form conductive polymer solid electrolyte layer 5 between positive electrode 1 and negative electrode 2.

The following is a brief description of a method of manufacturing a conductive polymer microparticle dispersion (hereinafter, referred to simply as "dispersion") used for solid electrolyte layer 5. First, a dispersion liquid is prepared by dispersing, in a water-based solvent, at least one monomer selected from thiophenes and their derivatives, and at least one polyanion selected as a dopant from polyanions. Next, the dispersion liquid is mixed with an oxidizing agent so as to oxidatively polymerize the monomer. The result is a conductive polythiophene dispersion doped with the polyanion.

The thiophenes and their derivatives applicable as the monomer have a π-conjugated structure. Examples of this monomer include the following: thiophene, 3-methylthiophene, 3-ethylthiophene, 3-propylthiophene, 3-butylthiophene, 3-hexylthiophene, 3-heptylthiophene, 3-octylthiophene, 3-nonylthiophene, 3-decylthiophene, 3-methoxythiophene, 3-ethoxythiophene, 3-butoxythiophene, 3-methyl-4-methoxythiophene, 3,4-ethylenedioxythiophene, benzothiophene, and benzodithiophene. Among them, 3,4-ethylenedioxythiophene is especially preferable because it can be polymerized at a moderate rate and can also provide the resultant polymer with high heat resistance.

The polyanions that can be used as the dopant include the following: polyvinyl sulfonic acid, polystyrene sulfonic acid, polyacrylic sulfonic acid, polyacrylamide tertiary butylsulfonic acid, polyacrylic acid, polymethacrylacid, polymaleic acid, copolymers containing these structural units, and the ammonium, lithium, and sodium salts of these polyanions. Among them, polystyrene sulfonic acid is especially preferable because of its excellent dispersibility and heat resistance. These polyanions may be used alone or in combination of two or more.

The weight-average molecular weight of the polyanions is preferably 10000 to 400000, inclusive, more preferably 30000 to 200000, inclusive, and most preferably 50000 to 100000, inclusive. The number-average molecular weight of the polyanions is preferably 1000 to 300000, inclusive, more preferably 10000 to 150000, inclusive, and most preferably 20000 to 100000, inclusive.

It is possible to use, as the oxidizing agent, a first oxidizing agent which produces iron ions in a solvent. Examples of the first oxidizing agent include the following: iron salts of inorganic acids such as iron chloride (III), iron sulfate (III), and iron nitrate (III); and iron salts of organic acids such as iron methoxybenzenesulfonate and iron toluenesulfonate. Among them, iron sulfate (III) is particularly preferable because it can allow the monomer to be polymerized at a moderate rate and can also provide the resultant polymer with high heat resistance. Iron sulfate (III) is hereinafter referred to as ferric sulfate.

The first oxidizing agent may be used together with a second oxidizing agent which does not produce iron ions in a solvent. Examples of the second oxidizing agent include the following: hydrogen peroxide, persulfate, permanganate, benzoyl peroxide, and ozone. Among them, ammonium persulfate is especially preferably because of the following features: it can be kept for a long period, be easy to care for, allow the monomer to be polymerized at a moderate rate, and also provide the resultant polymer with high heat resistance. Note that the oxidizing agent is not limited to the first and second oxidizing agents.

It is preferable that the water to be used as the solvent be ion exchange water or distilled water because of their low impurity content. The solvent is water-based, which means that the solvent consists of about 95% or more of water and only trace amounts of impurities or additives.

The following is a description of how to prepare the dispersion liquid. The monomer and the polyanion are added at the same time to the water in a container under shear stress applied by a dispersing machine. Alternatively, the monomer and the polyanion may be added sequentially to the water in the container under shear stress applied by the dispersing machine. Further alternatively, the monomer and the polyanion may be added to the water in the container first, and then be exposed to shear stress applied by the dispersing machine. Examples of the dispersing machine include a homomixer and a high-pressure homogenizer.

Adding the monomer and the polyanion at the same time to the water takes less time for dispersion than adding them sequentially. Instead of adding the monomer first and then the polyanion, the polyanion can be added first and then the monomer. Furthermore, some of the water may be placed in the container before adding the monomer and the polyanion, and then the remaining water may be added in a plurality of batches during dispersion.

The objective of these operations is to disperse the monomer having a hydrophobic π-conjugated structure into water by making it in the form of microparticles, and these operations are not the only possible approaches. In the case of using a solid or viscous polyanion, it can be dissolved or diluted in water and be used as an aqueous solution.

The preferable water content is 9 parts by weight or more with respect to 1 part by weight of the monomer. When the water content is less than this amount, the dispersion liquid may become too viscous during the polymerization, possibly making it impossible to obtain a uniform conductive polymer microparticle dispersion.

The preferable polyanion content is 1 to 5 parts by weight, inclusive with respect to 1 part by weight of the monomer. When the polyanion content is less than 1 part by weight, the resultant conductive polymer has a low conductivity. When, on the other hand, the polyanion content is more than 5 parts by weight, the conductivity of the resultant conductive polymer hardly increases. As a result, considering the material cost, it is preferable to use 5 parts by weight or less of the polyanion.

The monomer is oxidatively polymerized in the following manner. An oxidizing agent is added to the above-prepared dispersion liquid under shear stress applied by a dispersing machine. In the case of using a solid or viscous oxidizing agent, it can be dissolved or diluted in water and be used as an aqueous solution. Thus, the monomer in a dispersed state is oxidatively polymerized to form a polymer (hereinafter, polythiophene) in the form of microparticles. The monomer is kept under shear stress applied by the dispersing machine even after the oxidizing agent is added until the polymerization is over. As a result, a polythiophene dispersion doped with the polyanion is completed. The dispersion liquid and the oxidizing agent may be put into separate devices before the oxidatively polymerizing of the monomer. Thus, how to oxidatively polymerize the monomer is not particularly limited as long as the dispersion liquid and the oxidizing agent are mixed with each other.

During the polymerization, the dispersion liquid is controlled at a temperature of not more than 35° C. and to have a dissolved oxygen concentration of not more than 7 ppm. The temperature of the dispersion liquid is preferably not less than 0° C. because otherwise the dispersion liquid may freeze.

Effects of the exemplary embodiment will now be described with reference to specific examples.

Examples 1-4

First, as a monomer having a π-conjugated structure, 3,4-ethylenedioxythiophene is added to distilled water in a container. Next, as a polyanion, a 29.5% aqueous solution of polystyrene sulfonic acid is added thereto. Then the resultant mixture is exposed to shear stress applied by a homomixer for ten minutes to prepare a dispersion liquid of 3,4-ethylenedioxythiophene.

While the dispersion liquid is under shear stress applied by the homomixer, a refrigerant is circulated through a heat exchanger soaked in the dispersion liquid so as to maintain the temperature of the dispersion liquid at 0.5° C. Furthermore, the dispersion liquid is bubbled with nitrogen gas to maintain the dissolved oxygen concentration at 1 ppm. In this situation, a 2.25% aqueous solution of ferric sulfate is added as the first oxidizing agent, and then a 28.8% aqueous solution of ammonium persulfate is added as the second oxidizing agent. After the addition of these oxidizing agents, shear stress is applied for 24 consecutive hours by the homomixer while maintaining the temperature and oxygen concentration of the dispersion liquid, and then the polymerization is terminated. Thus, the conductive polymer microparticle dispersion is completed.

Example 1 uses the following materials in the following contents: 14.2 parts by weight of 3,4-ethylenedioxythiophene, 30.5 parts by weight of polystyrene sulfonic acid, 13.0 parts by weight of ferric sulfate, 29.8 parts by weight of ammonium persulfate, and 1337 parts by weight of distilled water.

In Examples 2, 3, and 4, conductive polymer microparticle dispersions are prepared in the same manner as in Example 1 except that the amount of nitrogen gas used for bubbling is adjusted to control the oxygen concentrations of the dispersion liquids at 3 ppm, 5 ppm, and 7 ppm, respectively during the polymerization.

The dissolved oxygen concentrations in the dispersion liquids are measured with a dissolved oxygen meter available from Mettler Toledo. This meter includes an InPro 6800 oxygen sensor. The measurement principle will be briefly described as follows. This sensor includes a cylindrical outer body in which a platinum electrode as a working electrode and a silver electrode as a counter electrode are soaked in an aqueous potassium chloride solution (electrolytic solution) with a concentration of 0.1 M. These components are sealed with an oxygen permeable membrane formed at the tip of the outer body.

The sensor is soaked in the dispersion liquid as a test sample, and a polarization voltage required for oxygen reduction is applied to the platinum electrode. As a result, oxygen molecules that have permeated the oxygen permeable membrane are reduced on the platinum electrode, and at the same time, the silver electrode is oxidized, allowing silver ions to elute in the electrolytic solution. The dissolved oxygen partial pressure in the test sample is proportional to the current flowing at this time. Consequently, measuring this current flow makes it possible to calculate the dissolved oxygen partial pressure in the test sample and hence to convert the dissolved oxygen partial pressure into a dissolved oxygen concentration. Thus, the dissolved oxygen concentration can be determined by measuring the reduction current.

Examples 5-8

Conductive polymer microparticle dispersions are prepared in the same manner as in Example 1 except that the temperature of the dispersion liquids is controlled at 5° C. and that the oxygen concentrations are controlled at 1 ppm, 3 ppm, 5 ppm, and 7 ppm, respectively in Examples 5, 6, 7, and 8.

Examples 9-12

Conductive polymer microparticle dispersions are prepared in the same manner as in Example 1 except that the temperature of the dispersion liquids is controlled at 20° C. and that the oxygen concentrations are controlled at 1 ppm, 3 ppm, 5 ppm, and 7 ppm, respectively in Examples 9, 10, 11, and 12.

Examples 13-16

Conductive polymer microparticle dispersions are prepared in the same manner as in Example 1 except that the temperature of the dispersion liquids is controlled at 35° C. and that the oxygen concentrations are controlled at 1 ppm, 3 ppm, 5 ppm, and 7 ppm, respectively in Examples 13, 14, 15, and 16.

Comparative Examples 1 and 2

Conductive polymer microparticle dispersions are prepared in the same manner as in Example 1 except that the temperature of the dispersion liquids is controlled at 0.5° C. and that the oxygen concentrations are controlled at 8 ppm and 10 ppm, respectively in Comparative Examples 1 and 2.

Comparative Examples 3 and 4

Conductive polymer microparticle dispersions are prepared in the same manner as in Example 1 except that the temperature of the dispersion liquids is controlled at 20° C. and that the oxygen concentrations are controlled at 8 ppm and 10 ppm, respectively in Comparative Examples 3 and 4.

Comparative Examples 5 and 6

Conductive polymer microparticle dispersions are prepared in the same manner as in Example 1 except that the temperature of the dispersion liquids is controlled at 35° C. and that the oxygen concentrations are controlled at 8 ppm and 10 ppm, respectively in Comparative Examples 5 and 6.

Comparative Examples 7-9

Conductive polymer microparticle dispersions are prepared in the same manner as in Example 1 except that the temperature of the dispersion liquids is controlled at 40° C. and that the oxygen concentrations are controlled at 1 ppm, 5 ppm, and 7 ppm, respectively in Comparative Examples 7, 8, and 9.

The conductive polymer microparticle dispersions prepared in the above-described manner each contains poly3,4-ethylenedioxythiophene doped with the polystyrene sulfonic acid. These dispersions are washed and filtered with distilled water, and then the concentration of the poly3,4-ethylenedioxythiophene is adjusted to 2.5%. Next, each capacitor element 10 is impregnated with the corresponding dispersion to form solid electrolyte layer 5, thereby preparing a wound electrolytic capacitor having a rated voltage of 35 V and a capacitance of 47 µF. The capacitors have property target values: a capacitance of 47 µF±20%, an ESR initial value of not more than 40 mΩ, and an ESR value of not more than 3.5 times the initial value, when measured after the heat resistance test.

Table 1 shows the ESR initial values of the electrolytic capacitors manufactured by using the conductive polymer microparticle dispersions of the Examples and the Comparative Examples, and the ESR values of these electrolytic capacitors when measured after the heat resistance test conducted for five hours at 135° C. (as a ratio with respect to the ESR initial value).

TABLE 1

|  | temperature of dispersion liquid during oxidative polymerization (° C.) | dissolved oxygen concentration in dispersion liquid during oxidative polymerization (ppm) | ESR of the electrolytic capacitor | |
| --- | --- | --- | --- | --- |
|  |  |  | initial value (mΩ) | value ratio after the heat resistance test with respect to the initial value (times) |
| Example 1 | 0.5 | 1 | 24.6 | 1.2 |
| Example 2 | 0.5 | 3 | 25.5 | 1.3 |
| Example 3 | 0.5 | 5 | 27.0 | 1.6 |
| Example 4 | 0.5 | 7 | 32.6 | 2.5 |
| Example 5 | 5 | 1 | 25.2 | 1.3 |
| Example 6 | 5 | 3 | 26.2 | 1.4 |
| Example 7 | 5 | 5 | 27.7 | 1.6 |
| Example 8 | 5 | 7 | 33.6 | 2.5 |
| Example 9 | 20 | 1 | 26.6 | 1.7 |
| Example 10 | 20 | 3 | 27.6 | 1.8 |
| Example 11 | 20 | 5 | 29.0 | 2.0 |
| Example 12 | 20 | 7 | 34.8 | 3.2 |
| Example 13 | 35 | 1 | 29.2 | 2.8 |
| Example 14 | 35 | 3 | 30.4 | 2.9 |
| Example 15 | 35 | 5 | 32.2 | 3.0 |
| Example 16 | 35 | 7 | 38.5 | 3.5 |
| Comparative Example 1 | 0.5 | 8 | 53.2 | 4.2 |
| Comparative Example 2 | 0.5 | 10 | 55.3 | 4.4 |
| Comparative Example 3 | 20 | 8 | 53.9 | 4.3 |
| Comparative Example 4 | 20 | 10 | 56.4 | 4.6 |
| Comparative Example 5 | 35 | 8 | 57.3 | 4.9 |
| Comparative Example 6 | 35 | 10 | 58.0 | 4.9 |
| Comparative Example 7 | 40 | 1 | 43.9 | 4.6 |
| Comparative Example 8 | 40 | 5 | 51.8 | 4.9 |
| Comparative Example 9 | 40 | 7 | 58.0 | 5.4 |

In Examples 1-16, during the oxidative polymerization, the temperatures of the dispersion liquids are controlled at 35° C. or less and the dissolved oxygen concentrations in the dispersion liquids are controlled at 7 ppm or less. As apparent from Table 1, in Examples 1-16, the ESR initial values are 24.6 to 38.5 mΩ, which fall within the target range of not more than 40 mΩ. The ESR values measured after the heat resistance test are 1.2 to 3.5 times the initial values, which fall within the target range of not more than 3.5 times the initial values.

Furthermore, in Examples 1-3, 5-7, and 9-11 among Examples 1 to 16, during the oxidative polymerization, the temperatures of the dispersion liquids are controlled at 20° C. or less and the dissolved oxygen concentrations in the dispersion liquids are controlled at 5 ppm or less. In these Examples, the ESR initial values are 29.0 mΩ or less, and the ESR values after the heat resistance test are not more than twice the initial values, which are far lower than in Examples 4, 8, and 12-16. Thus, it is preferable that during oxidative polymerization, the temperature of the dispersion liquid be not more than 20° C. and that the dissolved oxygen concentration in the dispersion liquid be not more than 5 ppm. Although it is costly to maintain these conditions, ESR of the electrolytic capacitor can be lowered and heat resistance thereof can be enhanced.

In Comparative Examples 1-6, on the other hand, during the oxidative polymerization, the temperatures of the dispersion liquids are controlled at 35° C. or less whereas the dissolved oxygen concentrations in the dispersion liquids are over 7 ppm. In these Comparative Examples, the ESR initial values are 53.2 to 58.0 mΩ, and the ESR values after the heat resistance test are 4.2 to 4.9 times the initial values. All these values are greater than in Examples 1-16.

In Comparative Examples 7-9, during the oxidative polymerization, the dissolved oxygen concentrations in the dispersion liquids are 7 ppm or less, whereas the temperatures of the dispersion liquids are over 35° C. In these Comparative Examples, the ESR initial values are 43.9 to 58.0 mΩ, and the ESR values after the heat resistance test are 4.6 to 5.4 times the initial values. All these values are greater than in Examples 1-16.

As described above, an electrolytic capacitor can have low ESR and high heat resistance only when both the temperature of the dispersion liquid and the oxygen concentration in the dispersion liquid during polymerization are in satisfactory conditions. The reason for this is explained as follows.

Oxidative polymerization to generate conductive polymers having a π-conjugated structure is accompanied by a radical reaction. The rate of the radical reaction depends on the temperature of the dispersion liquid, and increases with the temperature of the dispersion liquid. Furthermore, in the case of the presence of oxygen, the generated radicals react with the oxygen, thereby inhibiting the polymerization. In other words, the higher the dissolved oxygen concentration in the dispersion liquid, the more easily the polymerization is inhibited.

Polymerization proceeding too quickly or inhibited too much tends to generate a greater number of short-chain polymers. An electrolytic capacitor manufactured by using a conductive polymer microparticle dispersion containing a large number of short-chain polymers as a solid electrolyte has high ESR both in the initial state and after the heat resistance test.

This is considered to be the reason why a large number of short-chain polymers are generated when, during oxidative polymerization, the temperature of the dispersion liquid exceeds 35° C. or the dissolved oxygen concentration in the dispersion liquid exceeds 7 ppm.

The exemplary embodiment has described a wound solid electrolytic capacitor containing aluminum foils as electrodes, but the present invention is not limited to this configuration. The conductive polymer microparticle dispersions manufactured according to the method of the present exemplary embodiment can be applied, for example, to the following capacitors: a wound solid type including electrodes made of valve metal foils other than aluminum; a stacked type; a type including a positive electrode body made of a sintered valve metal; and a hybrid type containing both a solid electrolyte and an electrolytic solution.

The materials, manufacturing methods, and evaluation techniques described in Examples 1 to 16 are mere examples and do not limit the present invention thereto.

The present invention is useful for an electrolytic capacitor including a conductive polymer microparticle dispersion.

What is claimed is:

1. A method of manufacturing a conductive polymer microparticle dispersion, the method comprising:
    preparing a dispersion liquid including one of thiophene and derivatives thereof, a polyanion, and a solvent; and
    mixing the dispersion liquid with an oxidizing agent so as to oxidatively polymerize the one of thiophene and derivatives thereof,
    wherein, during the oxidative polymerization, a temperature of the dispersion liquid is 35° C. or less and a dissolved oxygen concentration of the dispersion liquid is 7 ppm or less.

2. The method according to claim 1, wherein during the oxidative polymerization, the temperature of the dispersion liquid is 20° C. or less and the dissolved oxygen concentration of the dispersion liquid is 5 ppm or less.

3. The method according to claim 1, wherein during the oxidative polymerization, the dissolved oxygen concentration of the dispersion liquid is 3 ppm or less.

4. A method of manufacturing an electrolytic capacitor, the method comprising:
    impregnating a capacitor element including a positive electrode, and a dielectric oxide film layer formed on the positive electrode with the conductive polymer microparticle dispersion manufactured by the method of claim 1; and
    forming a conductive polymer solid electrolyte layer on the dielectric oxide film layer by removing a solvent component contained in the conductive polymer microparticle dispersion.

* * * * *